(12) United States Patent
Verzegnassi et al.

(10) Patent No.: US 7,853,213 B2
(45) Date of Patent: Dec. 14, 2010

(54) DATA RECEIVER HAVING MEANS FOR MINIMIZING INTERFERENCE AND METHOD USED IN SUCH A RECEIVER

(75) Inventors: Rodolfo Verzegnassi, Nice (FR); Thomas Aimon, Aix En Provence (FR)

(73) Assignee: ST-Ericsson SA, Geneva (CH)

( * ) Notice: Subject to any disclaimer, the term of this patent is extended or adjusted under 35 U.S.C. 154(b) by 188 days.

(21) Appl. No.: 10/584,096

(22) PCT Filed: Dec. 10, 2004

(86) PCT No.: PCT/IB2004/004186
§ 371 (c)(1),
(2), (4) Date: Jun. 22, 2006

(87) PCT Pub. No.: WO2005/064809
PCT Pub. Date: Jul. 14, 2005

(65) Prior Publication Data
US 2007/0147480 A1    Jun. 28, 2007

(30) Foreign Application Priority Data
Dec. 22, 2003    (EP) ................................ 03300281

(51) Int. Cl.
*H04B 1/00*    (2006.01)
*H04B 15/00*    (2006.01)

(52) U.S. Cl. .................... 455/63.1; 455/67.13; 455/515

(58) Field of Classification Search ................. 455/501, 455/504, 515, 63.1, 67.11, 67.13; 375/316, 375/147, 148, 150, 260, 243, 245, 258
See application file for complete search history.

(56) References Cited

U.S. PATENT DOCUMENTS

| | | | |
|---|---|---|---|
| 7,313,114 B2 * | 12/2007 | Karjalainen | 370/335 |
| 2002/0196842 A1 * | 12/2002 | Onggosanusi et al. | 375/148 |
| 2003/0012264 A1 * | 1/2003 | Papasakellariou et al. | 375/148 |
| 2003/0072282 A1 * | 4/2003 | Liang | 370/335 |
| 2004/0028121 A1 * | 2/2004 | Fitton | 375/144 |

FOREIGN PATENT DOCUMENTS

| | | |
|---|---|---|
| EP | 1 304 815 | 4/2003 |
| EP | 1 274 177 A2 | 8/2003 |
| WO | WO 03/063375 | 7/2003 |

* cited by examiner

*Primary Examiner*—Lana N Le
*Assistant Examiner*—Ping Y Hsieh
(74) *Attorney, Agent, or Firm*—William J. Kubida; Scott J. Hawranek; Hogan Lovells US LLP

(57) ABSTRACT

The present invention relates to a data receiver (5) for receiving user data and reference data (CPICH) coming from a transmitter 5 via at least a channel. This receiver comprises means for unscrambling (39,66,64) and means for despreading (40,68) received data, means for analyzing the characteristic of the channel (35), means for evaluating the contribution of interference of data caused by the channel (IEP1Fj-IEPKFj) and a substracter means intended for cancelling the contribution of interference in the user data, said substracter means (62) being placed before said unscrambling means.

10 Claims, 4 Drawing Sheets

DATA RECEIVER HAVING MEANS FOR MINIMIZING INTERFERENCE AND METHOD USED IN SUCH A RECEIVER

FIELD OF THE INVENTION

The present invention relates to a data receiver having means for minimizing interference.

BACKGROUND OF THE INVENTION

This kind of data receiver is used in mobile phones, which comply with the UMTS standard. For data transmission, this standard proposes to use spreading codes having orthogonality properties.

An important problem faced by such mobile phones is that the effect of propagation paths of the data is to be eliminated. A known solution for eliminating this interference is the use of the CPICH channel, which transmits 256 "1", transformed into "1+j" after modulation. So, at the receiver side in the mobile, the channel can be estimated in an easy way. The following references can be consulted as prior art considerations.

3GPP TSG R1-00-1371
"CPICH interference cancellation as a means for increasing DL capacity"
3GPP TSGR R4-01-0238
"CPICH interference cancellation as a mean for increasing DL capacity"
3GPP TSGR R1-01-0030
"Further results on CPICH interference cancellation"
3GPP TR 25.991 V2.0.0 (2001-03)

SUMMARY OF THE INVENTION

The invention proposes to improve the cancelling of a certain amount of interference with respect of the prior art cited above. According to the invention, a data receiver is defined in the following way:

A data receiver for receiving user data and reference data coming from a transmitter via at least a channel, comprising means for unscrambling and means for despreading received data, means for analyzing the characteristic of the channel, means for evaluating the contribution of interference of data caused by the channel and a subtracter means intended for cancelling the contribution of interference in the user data, said subtracter means being placed before said unscrambling means.

These and other aspects of the invention are apparent from and will be elucidated, by way of non-limitative example, with reference to the embodiment(s) described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
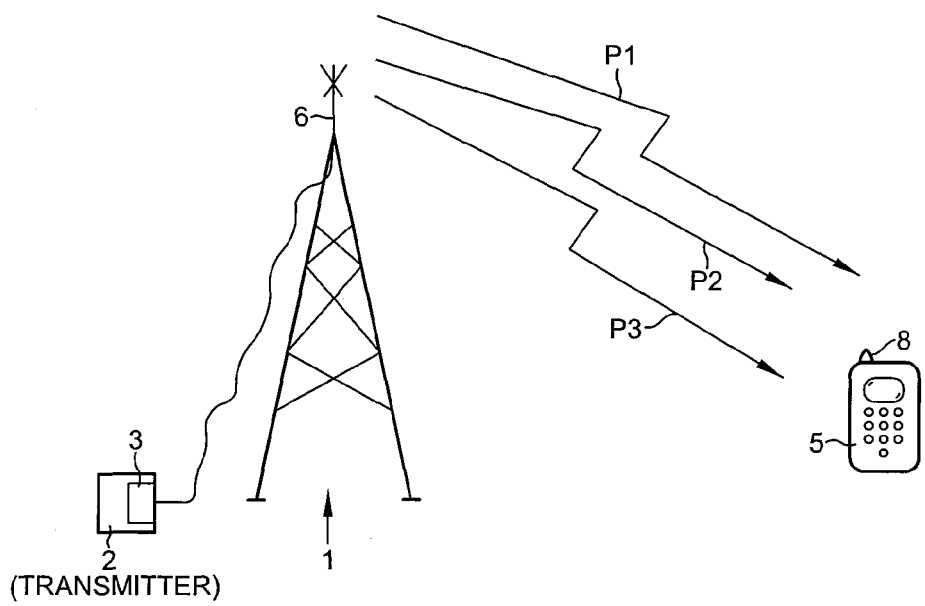
FIG. 1 shows a system in which the invention is applied.

FIG. 1 shows a system in which the invention is applied. The system is a CDMA system and concerns a cellular radio mobile system. Reference 1 shows a base station comprising a transmitter 2 having a high-frequency part 3 and the reference 5 a mobile station. The link from the base station to the mobile station or mobile is determined by a given scrambling code. The arrows P1, P2, P3 . . . indicate various paths, providing various delays $\tau 1, \tau 2, \tau 3$ . . . , by which the waves are propagated from an antenna 6 connected to the output of the high-frequency part 3 to an antenna 8 that the mobile 5 comprises. The mobile station can be interfered by links that have a different scrambling code.

Figure 2:
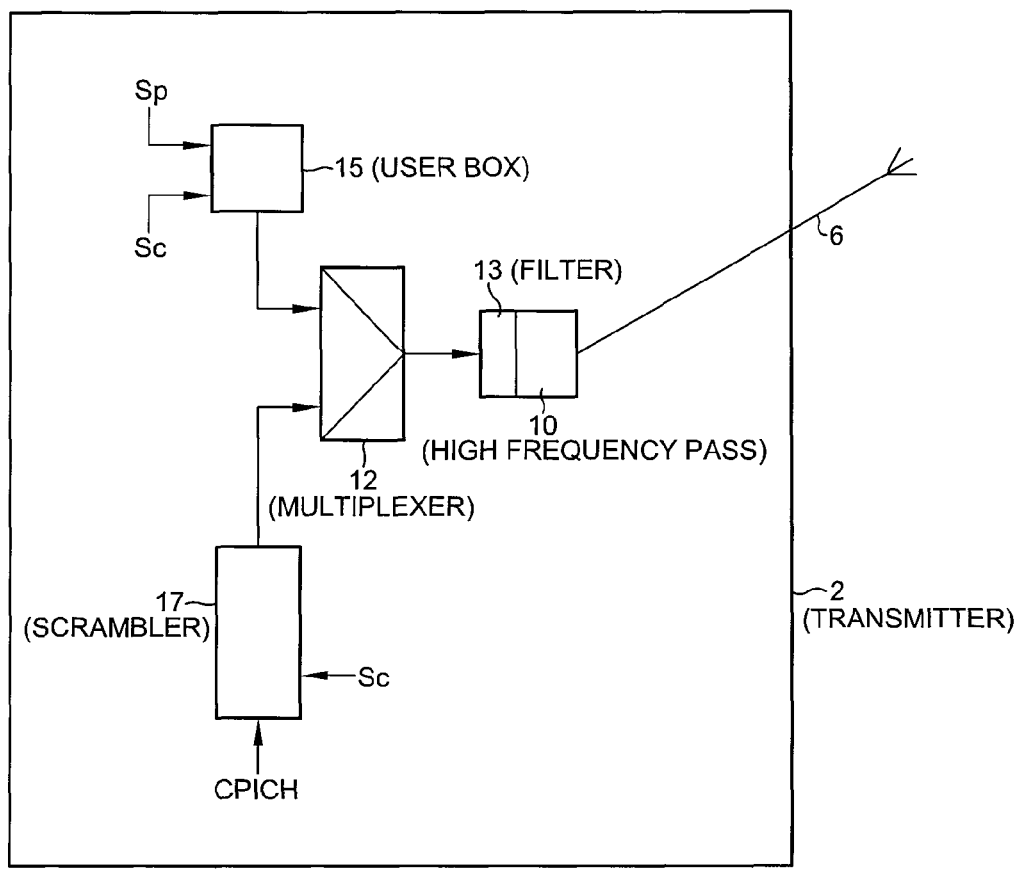
FIG. 2 shows a transmitter from which CPICH is transmitted.

FIG. 2 shows, the transmitter 2 in a schematic way. It comprises the high-frequency part 3 the output of which is connected to the antenna 6 and an input connected to a data multiplexer 12, via a transmitting filter 13. This multiplexer 12 receives, notably data from the user, which is indicated by a user box 15, and data coming from the CPICH. The CPICH data are formed by a "1" sequence. Before transmission, theses data are scrambled by a scrambling sequence Scr thanks to a scrambling device 17; a spreading code Sp is also applied, as is known.

Figure 3:
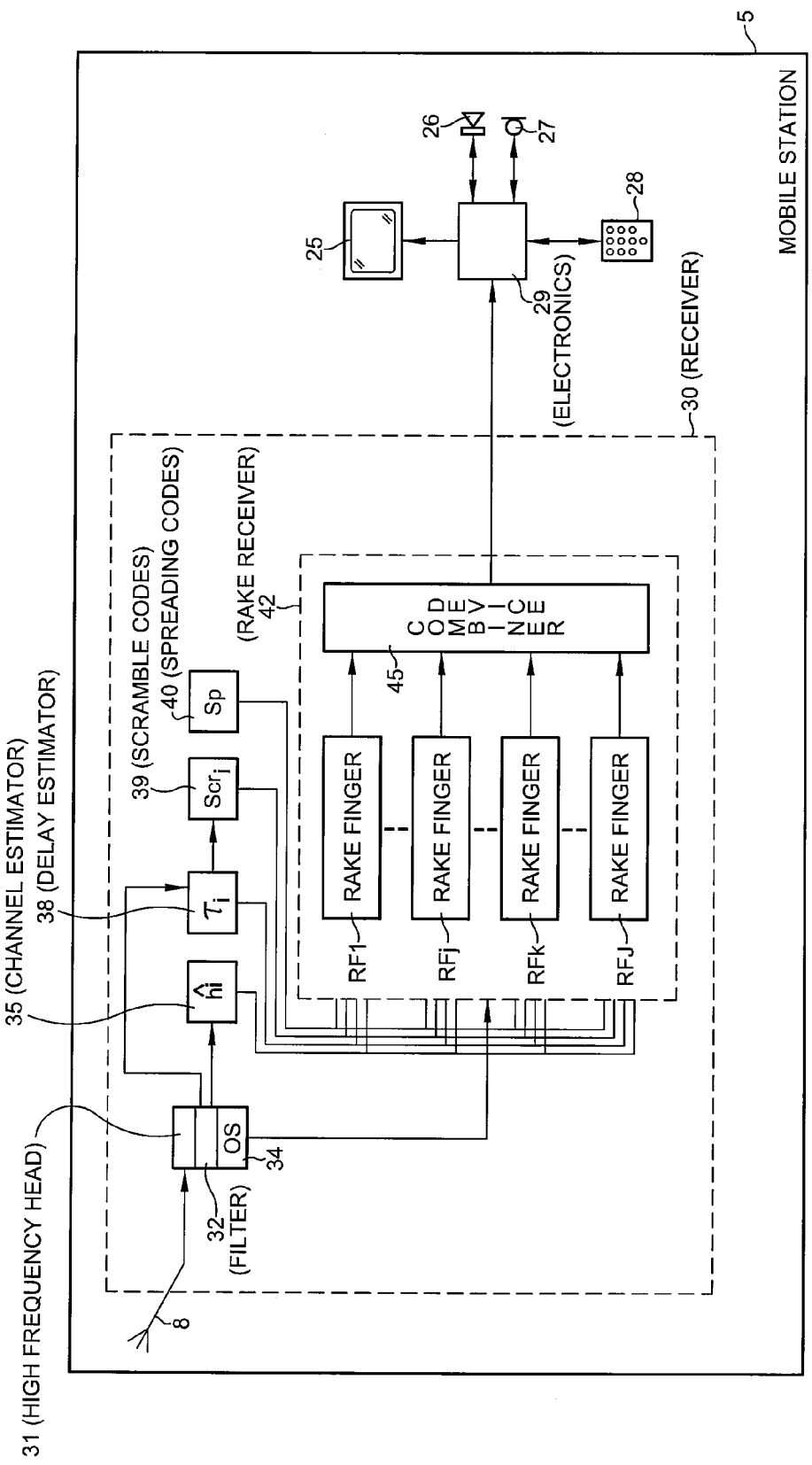
FIG. 3 shows a data receiver according to the invention.

FIG. 3 shows a mobile station 5 in a schematic way. As usual, it comprises a screen 25, a speaker 26, a microphone 27 and a keyboard 28. A general electronic part 29 manages all the tasks not specially covered by the invention. This Fig. shows a receiver part 30 in more detail. This part 30 comprises a high-frequency head 31 from which data are provided, after a high-rate receiving filter 32 elaborated by an over-sampling device 34. The high-frequency head 31 also supplies data to a channel estimator 35 and to a delay estimator 38, which determines the delays $\tau 1, \tau 2, \tau 3$ . . . , of the cited paths P1, P2, P3 . . . . Scrambling codes are delivered by a scrambling code generator 39 and spreading codes by a spreading code generator 40. All the codes provided by the elements 35, 38 and 39 can be used by a Rake type receiver 42. The output of this receiver 42 is connected to the input of the electronic part 29. The receiver 42 comprises a plurality of fingers RF1, . . . RFj, . . . RFk, . . . and RFJ as is usual for this kind of receiver. A combining device 45 combines all the information coming from the fingers to provide symbols.

Figure 4:
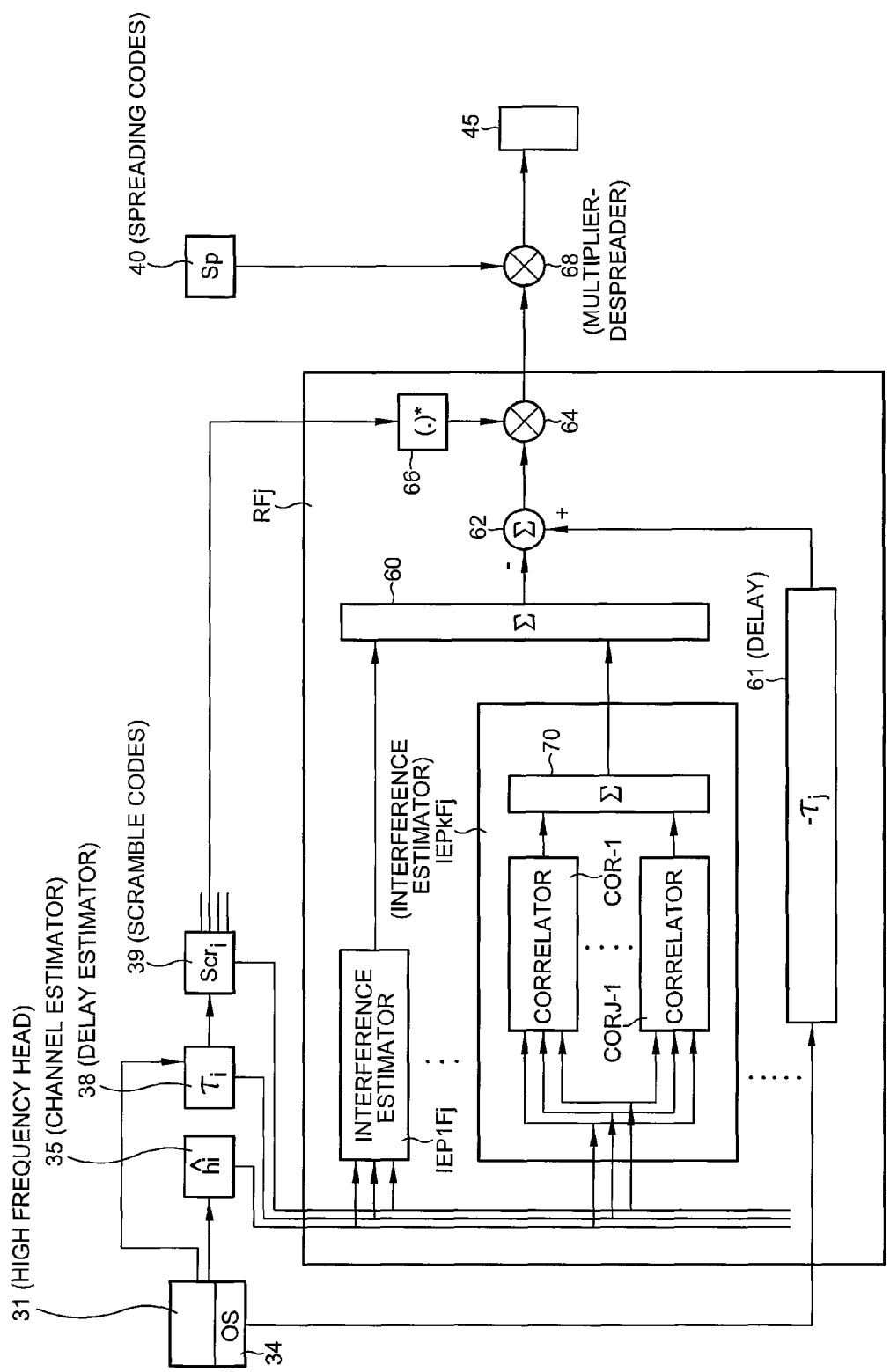
FIG. 4 shows a part of the receiver shown in FIG. 3.

FIG. 4 shows the structure of the Rake finger RFj cooperating with the other parts of the receiver. The finger RFj comprises a plurality of interference estimators allocated to each path respectively. IEPlFj is the interference estimator of the path 1 on finger 1. IEPkFj is the interference estimator of the path k on finger j and so on. The outputs of these estimators are added together by the adding device 60. The estimations of the interference are subtracted from the data signal provided by the head 31 thanks to a subtracter 62. The data signal are delayed by the delay device 61 which delays the data by an amount which has a relation to the delay of the path concerned. After this operation, an unscrambling operation is performed by the multiplier 64, which provides data from the scrambling code coming from generator 39. As the data are in complex form, a conjugate device 66 evaluates the conjugate of the scrambling code. This scrambling code is the scrambling code assigned to the link. Finally the data are despread by the multiplier 68 taking into account the code provided by the generator 40.

In FIG. 4 the interference estimator IEPkFj is shown in more detailed. It comprises a plurality of correlators COR1 . . . CORJ−1 the number of which is dependent on the number of paths. The output signals of these correlators are added together by the adder 70 and from here sent to the adder 60.

Figure 5:
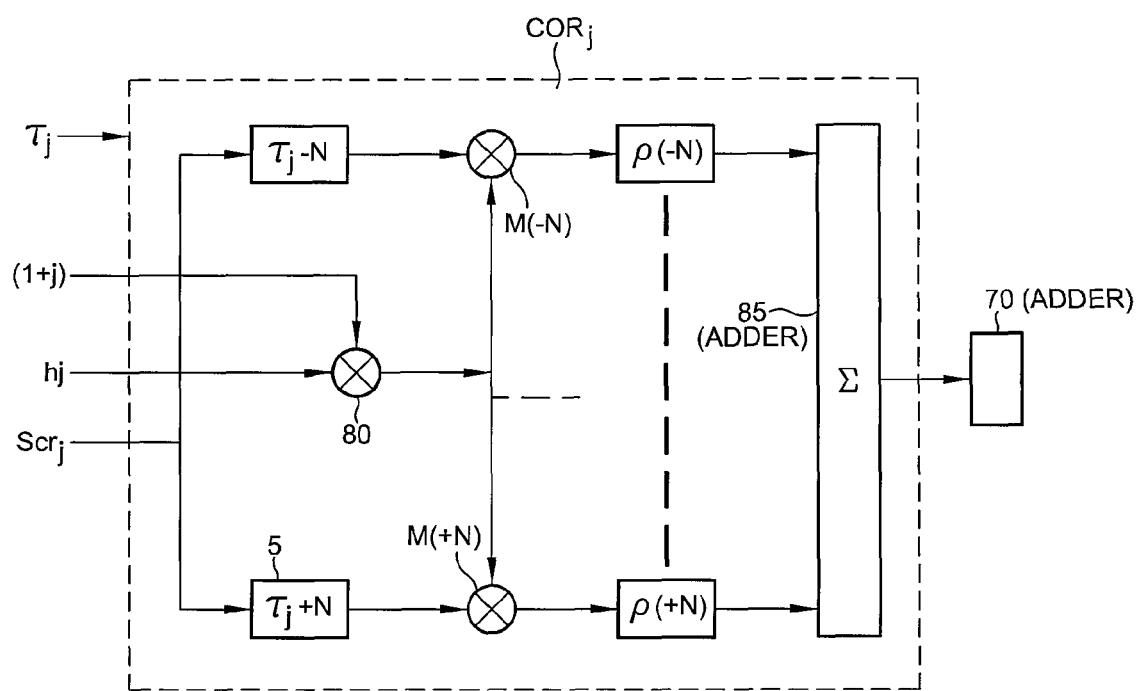
FIG. 5 shows a second part of the receiver shown in FIG. 3.

FIG. 5 shows the structure of the correlator CORJ. This correlator receives the scrambling codes Scrj of the other links which contribute to the interferences to be cancelled.

Note that there are J−1 such correlators for each finger, as it is possible to eliminate the interference of all j paths with j≠k, with k being the finger under consideration. For this purpose, the estimate ĥ j of the link and the delay τj of the other paths are considered. All these parameters are not the parameters of the main link but those of the parasitic ones. A multiplier 80 performs an operation concerning ĥ and the value of the CPICH i.e. "1+j" in complex form. 2 N multipliers M(−N) to M(+N) perform an operation with the scrambling code of the parasitic link delayed in accordance with the delay τj s of these links. The output signals of these multipliers are applied to the operators ρ(−N) to ρ(+N). N is taken into consideration in relation to the number of interference coefficients ρ, each coefficient being generated by the cross-correlation of the transmitting and the receiving filter, as in the formula below (where for example value N=8, but this may vary as a parameter). An adder 85 sums all the signals at the output of these multipliers before they are applied to the adder 70.

The working of the channel estimator is facilitated by the "1" sequence formed, coming from the CPICH and transformed into "1+j" considered in complex form. In this way, the coefficients ĥ of the impulse response of the channel are defined in an easy way. From these received data, the delay τ1, τ2, τ3 provided by the various paths P1, P2, P3, . . . are also estimated in the delay estimator 38.

Finally, the interference estimator carries out the following formula:

$$r(n) = \sum_{k=\Delta_{j,i}-8}^{\Delta_{j,i}+8} \rho(k*Tc - (\tau_j - \tau_i)) * \hat{h}_j * S_{c,n+k*Tc} * S_{p,n+k*tc} * (1+j)$$

In this formula:
ρ is the cross-correlation between the transmit and receive filter,
$\hat{h}_j$ is channel coefficients of the path j,
$S_{c,n}$ is the scrambling sequence,
$S_{p,n}$ is the spreading sequence of the pilot channel,
1+j is the CPICH symbol,
Tc is the duration of a chip (time slot obtained after scrambling),
$\tau_j - \tau_i$ is the delay between the path i and the path j,
with:

$$\tau_1 - \tau_0 = \Delta_{1,0} \cdot T_c + \Omega_{1,0} \cdot \frac{T_c}{OS} \quad |\Omega_{1,0}| < OS$$

OS is an integer that represents an over-sampling factor. $\Delta_{1,0}$ is an integer which measures the delay in $T_c$ unit and $\Omega_{1,0}$ the number of over-sampling periods. It is to be understood that the invention covers the case for which the realization of all the embodiments disclosed is made by a processor and convenient software.

The invention claimed is:

1. A data receiver for receiving user data and reference data coming from a transmitter via at least a channel, the data receiver, comprising:
    means for unscrambling data;
    means for despreading unscrambled data;
    means for analyzing a characteristic of the channel;
    a plurality of rake fingers of the data receiver, each rake finger comprising:
        means for respectively evaluating the contribution of interferences of data caused by the channel said means for respectively evaluating the contribution of interferences including a plurality of correlators, wherein each correlator receives scrambling codes of other links that contribute to the interference; and
        subtracter means for cancelling the contribution of interference in the user data for the rake finger, using the respectively evaluated interferences in each path of the rake finger, said subtracter means being placed before said unscrambling means.

2. The data receiver of claim 1, wherein the data are in compliance with the UMTS standard.

3. The data receiver of claim 2, wherein the reference data are provided by the CPICH channel.

4. The data receiver of claim 1, wherein the means for respectively evaluating the contribution of interferences further comprising:
    an interference estimator for each path in the rake finger, each interference estimator including a correlator adder to add the output of each correlator, and
    an interference adder to add the output of the interference estimator for each path; and
    the subtracter means is coupled to receive an output from the interference adder, adapted to subtract the output of the interference adder from the user data to provide a subtracted user data output, and coupled to provide the subtracted user data output to the means for unscrambling data.

5. The data receiver of claim 1, wherein the means for respectively evaluating comprises an adder to add an output of the interference estimators; and
    the subtracter means is located after the adder and adapted to receive and use an output from the adder to subtract interference from user data processed via the rake finger.

6. A method for receiving user data and reference data coming from a transmitter via at least a channel which causes interference in the user data, the method comprising the steps of:
    analyzing the characteristic of the channel by using the reference data;
    determining an evaluation of interference of data provided in each path by the channel in each of a plurality of rake fingers by combining output of a plurality of correlators, the number of correlators corresponding to the number of paths for the channel wherein each correlator receives scrambling codes of other links that contribute to the interference;
    subtracting the evaluation of interference from the received user data in each of the plurality of rake fingers;
    unscrambling the user data received via each of the plurality of rake fingers;
    adding the determined evaluation of each path in each of the plurality of rake fingers together to determine interference in the rake finger, wherein subtracting the evaluation of interference includes subtracting the determined interference in each of the plurality of rake fingers from user data processed via each of the plurality of rake fingers; and
    providing an output representing interference-corrected user data for unscrambling, and wherein unscrambling includes unscrambling the interference-corrected user data output.

7. A rake receiver for processing a received data signal, the rake receiver, comprising:

a plurality of rake fingers, each of the rake fingers comprising:
- an interference estimator to determine the interference in the path wherein each interference estimator includes a plurality of correlators, each correlator receiving scrambling codes of other links that contribute to the interference;
- an adder to add the determined path interferences from the interference estimators;
- a subtracter to subtract the added interferences from the received data signal to provide a corrected output corresponding to the received data signal with the interferences subtracted therefrom; and
- an unscrambler to receive and unscramble the corrected output to provide an unscrambled output;

a despreader to receive and despread the unscrambled output to provide a despread output; and a combiner to combine the despread output with outputs from others of the plurality of rake fingers.

8. The rake receiver of claim 7, each of the interference estimators, further comprises:

a plurality of correlators, each correlator adapted to generate an interference estimate for all j−1 paths in the received data signal, where j is not equal to the path of the finger in which the correlator is located; and an adder to add the output of the plurality of correlators, and to provide the output as the determined path interference for the interference estimator.

9. The rake receiver of claim 7, further comprising:

a conjugate device to evaluate the conjugate of a scrambling code for the data signal, and wherein the unscramble uses the evaluated conjugate to unscramble the corrected output.

10. The rake receiver of claim 7, wherein at least one of the correlators comprises:

a channel multiplier to multiply channel coefficients by a value of a channel symbol for the received data signal;

scrambling multipliers M(−N) and M(+N) to multiply an output from the multiplier with a scrambling code of a parasitic link delayed in accordance with a delay of the link;

operators $\rho(-N)$ to $\rho(+N)$ to operate on the output of the scrambling multipliers, where N corresponds to a number of interference coefficients $\rho$, each coefficient being generated by a cross-correlation of transmitting and receiving filters used for respectively transmitting and receiving the data signal; and an adder to sum the output of the scrambling multipliers as applied to the operators to provide the output of the correlator.

* * * * *